(No Model.) 2 Sheets—Sheet 1.
F. A. BONNEFIN.
PREPARING, EVAPORATING, AND CONCENTRATING SACCHARINE JUICES OR OTHER LIQUIDS, AND APPARATUS EMPLOYED THEREIN.
No. 246,285. Patented Aug. 30, 1881.
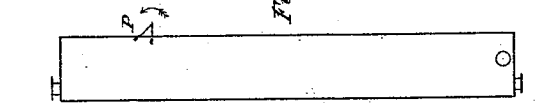
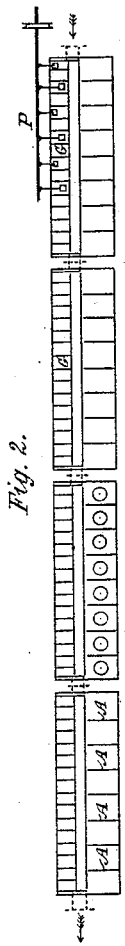
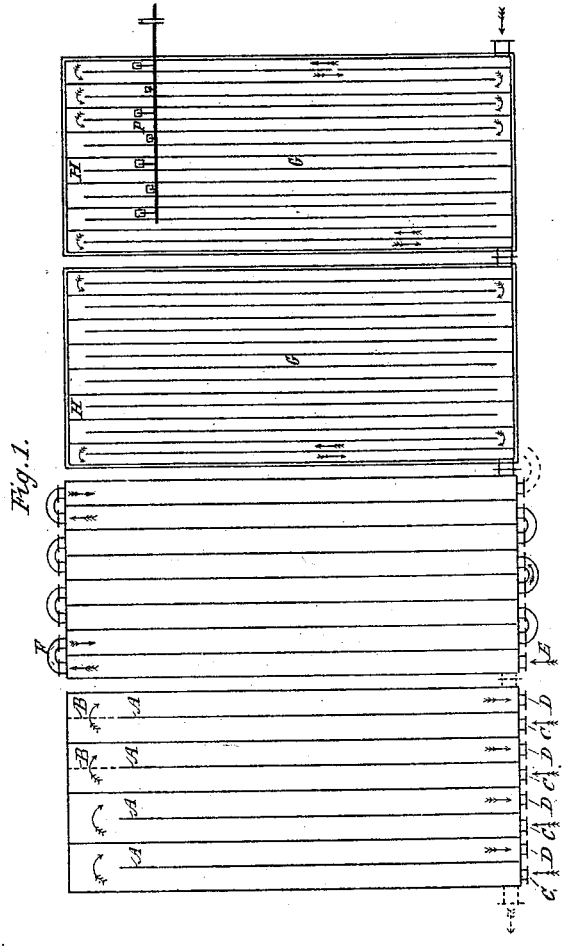
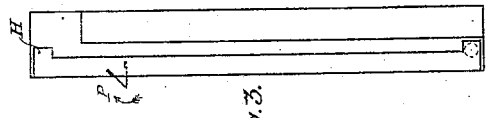
Witnesses:
Inventor:

(No Model.) 2 Sheets—Sheet 2.
F. A. BONNEFIN.
PREPARING, EVAPORATING, AND CONCENTRATING SACCHARINE JUICES
OR OTHER LIQUIDS, AND APPARATUS EMPLOYED THEREIN.
No. 246,285. Patented Aug. 30, 1881.
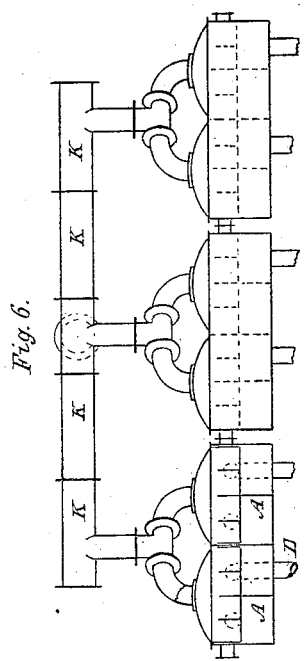
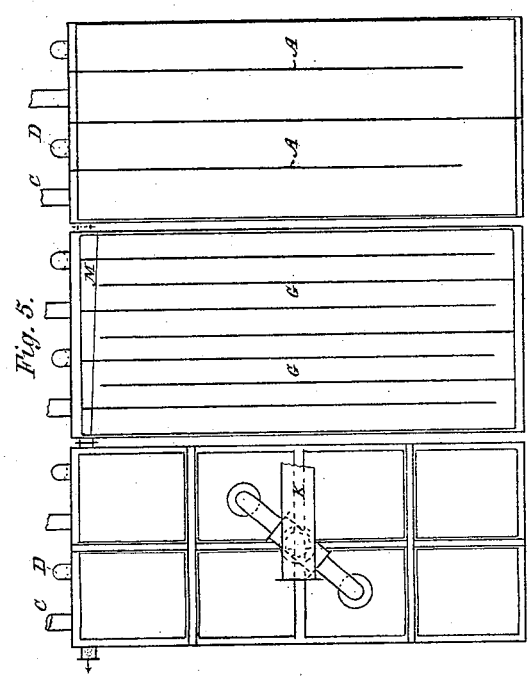
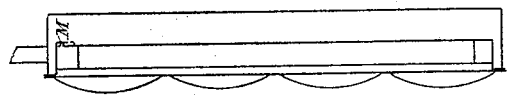
Witnesses: Inventor:

UNITED STATES PATENT OFFICE.

FRANÇOIS A. BONNEFIN, OF VACOA, MAURITIUS ISLAND, ASSIGNOR OF ONE-HALF TO BENJAMIN F. STEVENS, OF LONDON, ENGLAND.

PREPARING, EVAPORATING, AND CONCENTRATING SACCHARINE JUICES OR OTHER LIQUIDS, AND APPARATUS EMPLOYED THEREIN.

SPECIFICATION forming part of Letters Patent No. 246,285, dated August 30, 1881.

Application filed May 2, 1881. (No model.) Patented in England September 1, 1880.

*To all whom it may concern:*

Be it known that I, FRANÇOIS ALCIDE BONNEFIN, a subject of the Queen of Great Britain, and a resident of Vacoa, on the Island of Mauritius, have invented certain Improvements in Preparing, Evaporating, and Concentrating Saccharine Juices or other Liquids, and in Apparatus Employed therein, of which the following is a specification.

This invention is the subject of Letters Patent of Great Britain, No. 3,550, granted to me the 1st of September, 1880.

My invention has reference to the preparation and treatment of saccharine juices prior to the evaporation of the water therefrom; also, to the rapid evaporation of the water, and to the concentration of the juices or sirups, so as to reduce them to the state generally known as "*masse cuite*," and my invention is chiefly based upon the application of a determined heat in accordance with the known rules necessary for each of the operations.

The improvements consist in preparing, evaporating, and concentrating saccharine juices or sirups by first submitting the juice to the action of a moderate heat, which will not cause evaporation—say 80° to 99° centigrade—in an apparatus in which the heavy bodies or foreign matters held in suspension become removed; in then (after filtering or decanting it, if necessary) submitting the juice to evaporation and concentration by means of a powerful heat—say 200° to 300°, or even 400°, centigrade—which heat is only rendered possible without injuriously affecting the juice by the previous removal of the suspended bodies; and in then further concentrating the juice at a comparatively low temperature, each of these operations being conducted in apparatus in which the juice is acted upon in a continuous manner. The invention also includes the apparatus for carrying out the preparing, evaporating, and concentrating processes in the manner described; and also, specially, the construction of the preparing part of the apparatus—that is to say, the part of the apparatus for treating the juice prior to evaporation—with hollows or depressions for receiving and collecting the heavy suspended bodies contained in the juice.

In the annexed drawings, Figure 1 is a plan of the apparatus for preparing or treating the saccharine juices prior to the evaporation of the water therefrom, the said apparatus, as shown, being made, for facility, in four parts, as hereinafter explained. In the two parts to the left of the figure the upper pans, hereinafter described, are removed. Fig. 2 is a longitudinal section of the apparatus. Fig. 3 is a transverse section, and Fig. 4 an end view. Figs. 1 and 2 also show an arrangement of paddles or stirrers, for the purpose hereinafter explained. Fig. 5 is a plan representing an arrangement of vacuum-pans composed of six compartments. The two compartments in the middle of the figure are shown with the domes or covers removed, and the two at the right of the figure are shown with the upper pans, as well as the domes or covers, removed. Fig. 6 is an elevation, partly in section, of the vacuum-pan. Fig. 7 is a transverse section, and Fig. 8 is an end view.

For the preparation and treatment of saccharine juices prior to the evaporation of water therefrom, I construct an apparatus composed of a metallic vessel, the dimensions of which will depend upon the amount of juice it may be desired to treat. It may, for example, be thirty-two feet long and eighteen feet broad, and for facility of transport be made of four parts, as shown in Figs. 1 and 2, each being eight by eighteen feet. Each of these parts is divided transversely of the apparatus, by partitions, as shown, into, say, four chambers of two feet in width, and each of these chambers has a central incomplete partition, as represented at A—that is to say, a partition which does not quite extend to one of the ends of the chamber, or, if it does extend to that end, it has openings or holes near such end, as represented at B. That end wall of the chamber to which the incomplete partition is connected is formed with two holes, C D—viz., one on each side of the said partition. One of these holes is for the inlet of a heating-liquid or other heating medium, and the other for the outlet of such liquid after having traveled to the farther end of the chamber, round the end of the incomplete partition, and back again. This heating-liquid will therefore travel thirty-six feet in the chamber—that is to say, eighteen feet on each side of the incomplete partition. On leaving the chamber the liquid is conducted to any suitable apparatus, in which it can be reheated to the required temperature before returning again to the chamber above described; or, instead of the heating-liquid or other heating medium passing to one end of the chamber and returning again to the opposite end, it may, by a suitable arrangement of holes and connections, be made to pass only once across the apparatus or otherwise, as may be desired. For instance, by the use of connecting-pipes or elbows, as shown at E F, the heating-liquid may travel any desired number of times from end to end of the chamber.

The four outer walls of the vessel are, as seen in the figures, higher than the partitions which divide it into chambers, as explained. The outer walls may, for example, be thirty inches high, and the height of the partition be sixteen inches.

Upon the partitions, and fitting within the outer walls, I place a pan, G, preferably of copper, or a plate with sides to fit into the said outer wall. This pan is divided transversely by partitions, as shown—say four to six inches apart—the alternate partitions terminating a little short of two sides of the pan, respectively, so that a continuous zigzag channel going from side to side of the pan parallel with the channels in the vessel below, of great length, is formed; or, instead of the pan having partitions, its bottom may be corrugated in the form of a deep serpentine or zigzag channel or gutter, which is immersed in the heating-liquid or other heating medium circulating in the chambers below. The saccharine juice to be prepared or treated is admitted to the pan at one end, and, after circulating the entire length of the continuous channel parallel to the flow of the heating medium below, it issues at the other end. Along one side or other suitable part of the pan I form hollows or depressions, as indicated at H, to receive or collect the heavy bodies contained in the saccharine liquid, which bodies are naturally deposited in the said hollows or depressions during the flow of the liquid. These collecting-hollows are connected to one common collector placed below, by preference in a hot medium, or *bain marie*, formed by a current of heating-liquid or other heating medium. The saccharine juice introduced at its normal temperature—say 15° centigrade—being in contact during a travel of eleven hundred feet or more with a liquid or other heating medium admitted to the lower vessel at about 98° or 99°, will leave the farther end of the pan at a temperature of from 80° to 90°. This juice, as already stated, will become naturally deprived of all the heavy organic or inorganic matters in suspension, which will lodge in the hollows or depressions before described. It will also be deprived of all the lighter matters, which, by the gradual heating of the liquid, (which is, as usual, charged with lime or other chemical agent,) become separated and rise to the surface while the heavy bodies are being deposited in the collectors. The lighter bodies continue to rise without interfering with the flow of the liquid. It is desirable to remove them as they accumulate toward the lower part of the travel—that is to say, almost at the outlet from the pan—for being immediately utilized. A convenient way of removing them is to temporarily close the outlet, so that they may flow over the end of the pan. The pan, mounted and arranged as before described, is heated, as will be readily understood, like a *bain marie*, below 100° centigrade, and the juice, on its exit, which, as well as the inlet, is continuous, successively fills decanting-receivers, or preferably filtering-receivers, acting by capillarity, as described in the specification of another invention for which I have applied for Letters Patent on 2d May, 1881.

Instead of heating the pan by hot water, like a *bain marie*, as before described, it may be heated by evaporation arising from the treatment of the juice in the concentrating process or in the vacuum-pans. These vapors or evaporations would become condensed into distilled water, which could be utilized for the steam-generators or otherwise. The decanted or filtered juice is delivered in a pure state to be concentrated in an evaporator of simple single, double, or multiple effect, and afterward reduced into the state of *masse cuite* in a continuous vacuum-pan.

I may here remark that cold cane-juice charged with all its foreign matters, as it comes from the mill or other crushing apparatus, of an apparent density of 10° to 12° Baumé, should not be heated to more than 85° to 98° centigrade, to avoid complications in the solutions of certain starchy, albuminous, and other matters. When heated in an open vessel by a *bain marie*, or by evaporations, as before described, a higher temperature than 80° at the surface is not obtained; but the juice, when deprived of foreign matters by the apparatus before described and by the filters, is brought to its true density of 6° or 7° Baumé. It contains only pure water, pure sugar, pure liquid sugar, and dissolved coloring-matters. This liquid contains the crystallizable sugar and the uncrystallizable or liquid sugar, both of identical composition. By further heating the water will be evaporated, the crystallizable sugar will be concentrated, and the uncrystallizable sugar will retain the foreign salts and coloring-matters completely separated from the crystallizable sugar. There is therefore no danger in applying to this liquid at 6° or 7° Baumé a heat as powerful as may be wished in order to obtain a prompt evaporation. But a sufficient heat to evaporate rapidly cannot be obtained from ordinary generators, and a much higher heat must be obtained without fear of accident from expansion of vapor. I therefore employ oil (or other liquid capable of storing heat) heated to 250° or 300°, or even 400°, centigrade without vaporization, and consequently without expansion. I can also employ hot air or other heating medium.

An apparatus constructed like that hereinbefore described, and shown in Figs. 1 to 4 and with or without hollows or depressions such as indicated at M, Figs. 5 and 7, will evaporate a juice which marks 6° or 7° on entering to 25°, or more if required, on leaving. It is the vapor arising from the abundant evaporation of the juice thus heated that can be utilized, as before stated, for heating the cold juice in the apparatus hereinbefore described. In order to favor the evaporation or concentration of the juice, I place above the partitions of the evaporating apparatus a revolving shaft, as shown at P, Figs. 1 and 2, which carries a series of paddles, vanes, or scoops, arranged preferably in helical form. The paddles or analogous devices dip into every alternate channel of the evaporating apparatus, and as they revolve with their shaft they push back the liquid and lift and divide it in the air, which therefore removes a good deal of the water heated to so high a temperature.

If air be supplied by a fan, as it may be, it may with advantage be hot air taken from the furnace or otherwise.

The juice concentrated to 25° or more is ready to be reduced into the *masse cuite* in the continuous vacuum-pan of single, double, or multiple effect. This apparatus I construct like the first apparatus hereinbefore described, with some slight additions and modifications, in order to maintain the heat at a fixed and proper temperature, the heat being regulated in proportion to the juice being more and more concentrated.

It is known that the juice concentrated more and more should always be worked below 100° centigrade, both as regards the temperature of the vacuum-pan, which is 68°, and the temperature of the heat, which must be under 105°. This is not obtained in any existing vacuum-pans where the apparent temperature of the liquid and of the chamber of the vacuum-pan is about 68°, while the real temperature of the heat is about 160°, such as is furnished directly or indirectly by the generator. In order not to have too large an apparatus, several may be employed, which can either communicate or work separately.

The vacuum-pans are constructed like the pan of the apparatus hereinbefore described, but with narrower channels and of a sufficient length.

The vacuum-pan may be separated into several compartments, which, together with the vessel containing the heating medium, constitute only one apparatus. I will suppose one consisting of six compartments, as represented in Figs. 5 to 8, each of which is completely separated by its sides and domes, but is connected by a small pipe, so that the channels may communicate. The channel may be broader in the first compartment and decrease in width in the following compartments, because of the decrease through evaporation of the volume of the liquid.

The domes are constructed to resist the atmospheric pressure when the vacuum is produced in each chamber. The air-pumps are fitted to a main pipe, K, from which a pipe branches to each dome, as shown. The heating medium, beginning at 105° centigrade in the first compartment, will be lower than 100° in the last compartment, although the liquor is kept boiling and becomes more and more concentrated.

Although I have described the invention as applied only to the treatment of saccharine juices, the apparatus and mode of treatment may be also applied to other liquids—as, for example, saline solutions; but it is especially adapted to saccharine solutions.

I wish it understood that I do not claim, broadly, an evaporating-pan arranged over a furnace and having a zigzag channel through which the liquid flows, as such pans have long been used for the reduction of saccharine juices, notably those from sorghum; but What I do claim is—

1. The herein-described method of preparing saccharine juice for evaporation and concentration, which consists in submitting it to a moderate heat while flowing, which heat—say 80° to 99° centigrade—is not sufficient for evaporation, but is sufficient to cause the deposition of the heavy bodies held in suspension, and to cause the lighter foreign matters to rise to the surface, so that they may be readily removed, substantially as and for the purpose set forth.

2. The herein-described method of preparing, evaporating, and concentrating saccharine juices and other similar liquids by a continuous operation, which consists in first submitting the juice or liquid to the action of a moderate heat—say 80° to 99° centigrade—for the removal of heavy bodies and foreign matters held in suspension, then submitting the liquid thus prepared to a powerful heat—say from 200° to 400° centigrade—for evaporation, and then concentrating the liquid at a comparatively low temperature, substantially as and for the purposes set forth.

3. An apparatus for preparing or treating saccharine juices and other liquids prior to the evaporation of the water therefrom, comprising a metallic vessel with a zigzag channel or its equivalent, through which a heating medium is caused to flow, and a pan fitting into said vessel over said channel, in which pan is a zigzag channel, through which the liquid treated is caused to flow, the channels in the heating-vessel being arranged substantially parallel to those in the pan, as set forth.

F. A. BONNEFIN.

Witnesses:
   F. DE M. HARDING,
      27 *Leadenhall Street, London, E. C.*
   W. R. PULLEN,
      504 *Oxford Street, London, W. C.*